United States Patent

Sakamoto

[11] 4,347,457
[45] Aug. 31, 1982

[54] PERMANENT MAGNET TYPE STEPPING MOTOR

[75] Inventor: Masafumi Sakamoto, Kiryu, Japan

[73] Assignee: Japan Servo Co., Tokyo, Japan

[21] Appl. No.: 215,717

[22] Filed: Dec. 12, 1980

[30] Foreign Application Priority Data

Sep. 19, 1980 [JP] Japan .............................. 55-129216

[51] Int. Cl.³ .............................................. H02K 3/42
[52] U.S. Cl. .................................. 310/256; 310/156; 310/190
[58] Field of Search ................ 310/44, 114, 152, 168, 310/190, 181, 256, 50, 156, 49 R, 223

[56] References Cited

U.S. PATENT DOCUMENTS 2,020,591 11/1935 Temple ................................ 310/168
4,127,802 11/1978 Johnson ............................. 310/156

Primary Examiner—J. D. Miller
Assistant Examiner—D. L. Rebsch
Attorney, Agent, or Firm—Birch, Stewart, Kolasch & Birch

[57] ABSTRACT

A circular-plate permanent magnet, with its one side being magnetized as N-pole while the other as S-pole, which is sandwiched between two rotor yokes made of a magnetic circular plate, is mounted on a rotor shaft as one unit, and this unit makes up the rotor. The stator, which is arranged in a position where its inner surface opposes the outer periphery of the aforesaid rotor across a small air gap, is firmly held between a front cover and a rear cover. Around the outer periphery of the aforesaid rotor yokes, toothed-wheel-like jags which provide the permeance variations are installed. By letting DC current flow stepwise through the stator coils which are wound around the aforesaid stator, the rotor rotates stepwise. With $D_1$ and $D_2$ being the outside diameter and the inside diameter respectively of the cylindrical part on the inside diameter side of the front cover and rear cover, $D_0$ being the outside diameter of the rotor yokes, $L$ being the shaftwise length of the rotor shaft, $Gl$ being the dimension of the air gap between the outer periphery of the rotor yokes and the inner surface of the stator, $Dl$ being the distance between the end surface of the cylindrical part on the inside diameter side of the front and rear covers, and $n$ being any optional natural number, then by satisfying the expression of $$Dl/Gl > n \cdot (D_1^2 - D_2^2)/(4D_0 \cdot L)$$

the magnetic flux leaking outside the motor can be minimized to less than $1/n$ of the effective magnetic flux of the motor.

2 Claims, 7 Drawing Figures

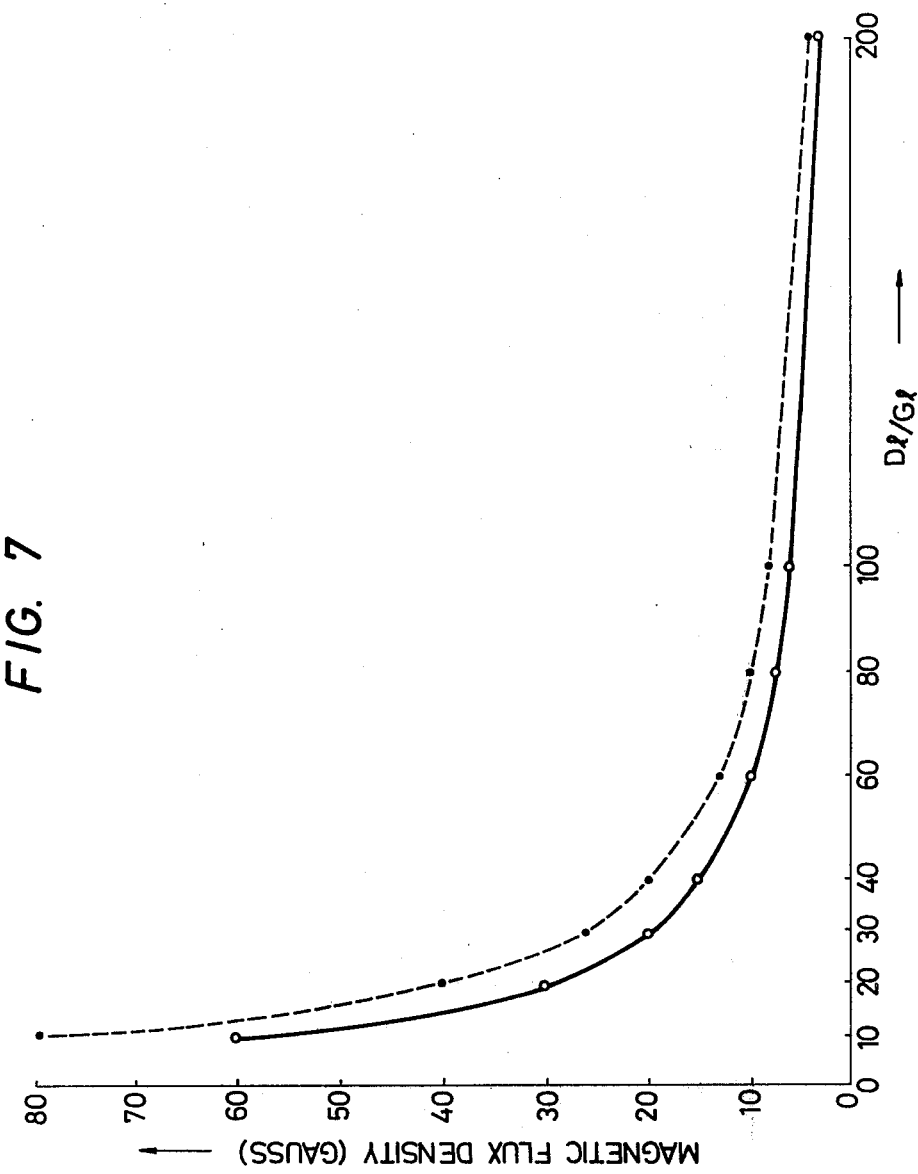

PERMANENT MAGNET TYPE STEPPING MOTOR

BACKGROUND OF THE INVENTION

The present invention relates to a permanent magnet type stepping motor which is driven by DC current and makes stepwise rotation, and it is particularly designed to minimize the leak of magnetic flux to the outside of the motor, so as to be used, for example, as a motor to drive the magnetic head of the magnetic disc which is in use as a peripheral instrument of electronic computers.

If the magnetic flux leaking outside from the stepping motor which drives the magnetic head is large, it gives rise to the problem of erasing the information memorized on the magnetic disc. To avoid this trouble, it is required to minimize the leaking magnetic flux generated from the motor as much as possible. In order to cope with this, conventionally a formula wherein the periphery of the motor is encircled by magnetic shield plates, or a formula wherein a magnetic plate is placed between the magnetic disc and the motor and the motor is installed on the side of the magnetic plate opposite the magnetic disc, has been employed. With these conventional formulae, however, there were such problematic points as insufficient reduction of leaking magnetic flux, requirement for an additional space; costwise, it is uneconomical as well.

BRIEF SUMMARY OF THE INVENTION

The objective of the present invention is to solve the aforesaid problematic points in the prior art, and to provide a permanent magnet type stepping motor which is equipped with a structure which facilitates the reduction of magnetic flux leaking outside the motor practically to a minimum.

The characteristic feature of the present invention is to have the motor equipped with the following structure, in order to attain the aforesaid objective; namely, (1) a circular-plate permanent magnet, one side being magnetized N pole, and the other S pole, which is sandwiched from both sides by two rotor yokes, each made of a magnetic circular plate, mounted on a rotor shaft as one unit by way of a hole penetrating through the center of the unit, this unit making up the rotor, (2) one of two components of a cover made of a magnetic material, consisting of an outside diameter side cylindrical part, a cover circular plate part and an inside diameter side cylindrical part provided at a central part of the aforesaid circular plate part, which makes up the front cover, and a second component which makes up the rear cover, (3) the rotor shaft of the aforesaid rotor is supported to ensure its free rotation by the inside diameter side of the respective inside diameter side cylindrical parts of the aforesaid front cover and the rear cover, (4) the stator, which is arranged in a position where its inner surface opposes the outer periphery of the aforesaid rotor yokes across a small air gap, held in a fixed position between the aforesaid front and rear covers by way of binding bolts and nuts, (5) a toothed-wheel for providing variations of permeance is installed around the outer periphery of the aforesaid rotor yokes which oppose the inner surface of the stator, so as to facilitate the rotor's stepwise rotation by way of letting DC current flow stepwise through the stator coils which are wound around the aforesaid stator, (6) and further, where the outside diameter of the respective inside diameter side cylindrical parts of the front and rear covers is $D_1$ and their inside diameter is $D_2$, where the outside diameter of the rotor yokes is $D_0$ and its shaftwise length is $L$, where the dimension of the air gap between the outer periphery of the rotor yokes and inner surface of the stator is $G_1$ and the air space distance from the end surface of the respective inside diameter side cylindrical parts of the front and rear covers to the opposing end surface of the rotor yokes is $D_1$, and where $n$ is any optional natural number, to minimize the magnetic flux leaking outside the motor down to less than $1/n$ of the effective magnetic flux of the motor by satisfying the relationship:

$$Dl/Gl > n \cdot (D_1^2 - D_2^2)/(4D_0 \cdot L)$$

BRIEF DESCRIPTION OF THE DRAWINGS

FIG. 7 is a chart showing one example of measured data of the magnetic flux leaking outside of the motor related to the present invention.

DETAILED DESCRIPTION

Figure 1:
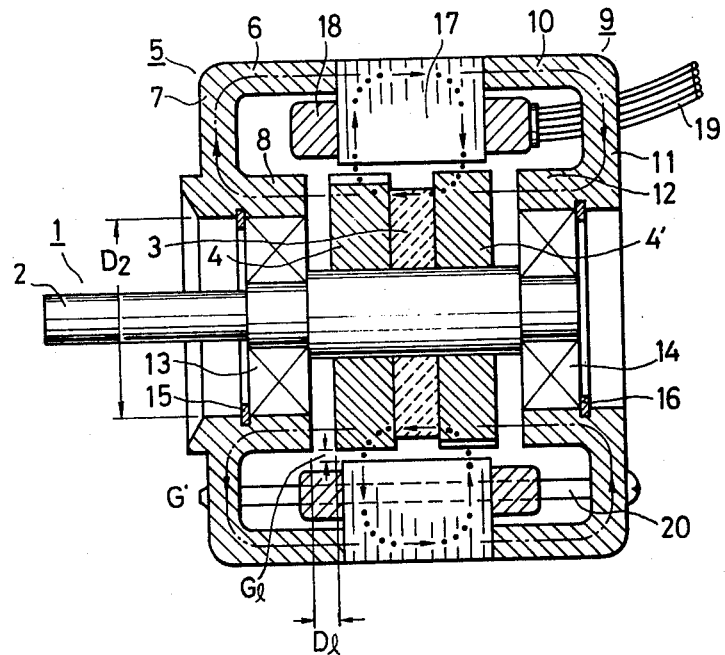
FIG. 1 is a sectional drawing of a motor which exhibits one embodiment of the present invention.
Figure 2:
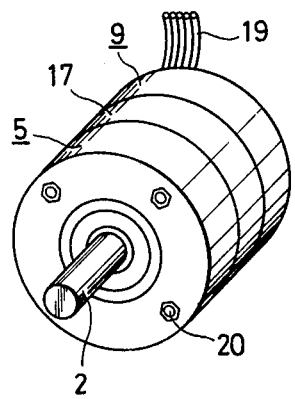
FIG. 2 is a drawing showing the outer appearance of the motor exhibited in FIG. 1.

FIG. 1 is a sectional drawing for demonstrating one embodiment of the present invention. FIG. 2 is a slanted view of the outer appearance of the aforesaid embodiment. In drawing, 1 is the rotor of the motor, which comprises rotor shaft 2, permanent magnet 3 and rotor yokes 4 and 4'. The permanent magnet 3 has a shape of a circular plate which is magnetized in poles, one surface being a positive (N) pole and another being a negative (S) pole, see from the perpendicular direction to the plate surface, namely along the shaft direction, while both sides of the permanent magnet are sandwiched by rotor yokes 4 and 4' respectively which are made of magnetic plates, and this component mounted on rotor shaft 2 as one unit by way of a hole penetrating through its center, so as to let it rotate with the rotor shaft in one unit. 5 is the front cover of the motor, which consists of outside diameter side cylindrical part 6, cover circular plate part 7 and inside diameter side cylindrical part 8, and is formed into one unit made of magnetic material, while its inside diameter side cylindrical part 8 is installed in the central part of cover circular plate 7. Similarly, 9 is the rear cover of the motor, which consists of outside diameter side cylindrical part 10, cover circular plate part 11 and inside diameter side cylindrical part 12, and is formed into one unit made of magnetic material, while its inside diameter side cylindrical part 12 is installed in the central part of cover circular plate part 11. 13 and 14 respectively are ball bearings, and they hold rotor shaft 2 of rotor 1 at two points of its front end and rear end (the side where the rotor shaft is protruding outside being the front) by the respective inside diameter sides of inside diameter side cylindrical part 8 of front cover 5 and inside diameter side cylindrical part 12 of rear cover 9 to facilitate its free rotation. 15 and 16 are respectively the retaining rings which prevent the shaftwise movement of ball bearings 13 and 14. 17 is the stator, which is made of the layers of stamped out magnetic iron plates, is firmly fixed on the outside diameter side cylindrical part 6 of front cover 5 and outside diameter side cylindrical part 10 of rear cover 9 respectively as one unit, so as to arrange its inner surface in a position opposing the outer periphery of rotor yokes 4 and 4' across a small air gap. 18 is the stator coils which are wound around stator 17, and 19 is the lead wires connected with stator coils 18. Further, 20 in FIG. 2 are the binding bolts and nuts which serve both as the binder of stator 17 with front cover 5 and rear cover 9 and the fixture of the motor.

Figure 3:
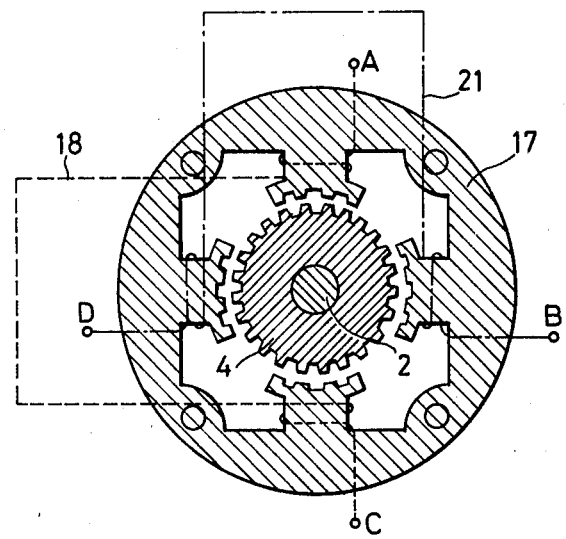
FIG. 3 is a sectional drawing for demonstrating the motion of a stepping motor.
Figure 4:
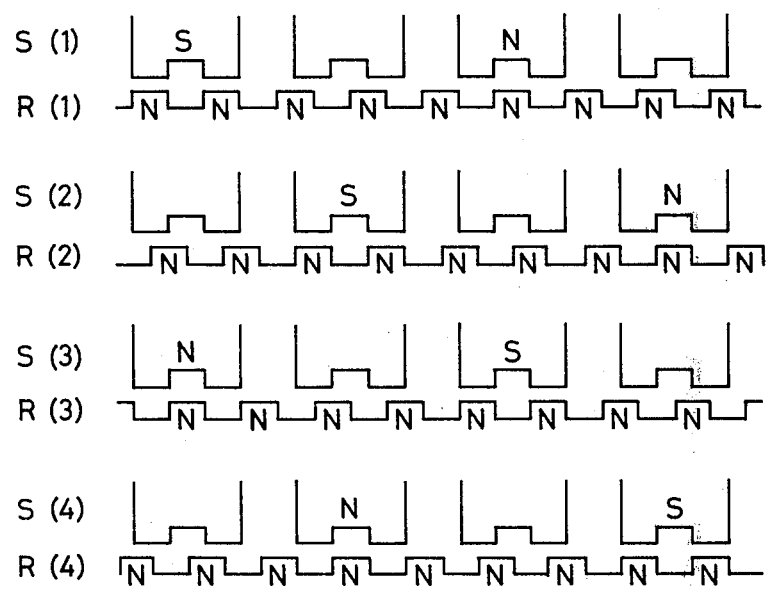
FIG. 4 is a development chart developing FIG. 3 along the direction of the air gap.

As shown in FIG. 3, on the outer periphery of rotor yokes 4 and 4' which oppose the inner surface of the stator, jags like a toothed-wheel are fabricated at the same pitch for providing the variations of permeance (equivalent to the reciprocal number of the magnetic resistance, called permeance), and also jags at a different pitch from the above are fabricated on the inner surface of the stator opposing the aforesaid outer periphery of the rotor. FIG. 3 is a sectional drawing cutting along the plane perpendicular to rotor shaft 2 of the embodiment motor shown in FIGS. 1 and 2, and FIG. 4 is a drawing developing FIG. 3 along the direction of the air gap. 18 in FIG. 3 indicates stator coils 18 shown in FIG. 1, while A indicates the terminal of winding start and C the terminal of winding end. Another stator coil 21 (not shown in FIG. 1) is wound around the stator, with B being the terminal of winding start and D being the terminal of winding end. In the developed drawing shown as FIG. 4, the number of the jags fabricated on the stator and the rotor yokes is reduced to a smaller number than that in FIG. 3 in order to make the demonstration simple.

The rotating motion of the stepping electric motor of the aforesaid structure is demonstrated in reference to FIGS. 3 and 4. First, in FIG. 3, if stator 17 is magnetically excited as shown by S(1) in FIG. 4 by letting the current flow from the winding start terminal A of stator 18 toward the winding end terminal C, rotor 1 is stabilized at the position R(1) in FIG. 4. In this R(1) of FIG. 4, though all the poles on the rotor are shown as positive (N) poles, it is only because of demonstrating along with the development chart sectioned at the plane, for example, involving rotor yoke 4 at the left side in FIG. 1, but in the development chart sectioned at the plane involving rotor yoke 4', all the poles on the rotor are to be negative (S) poles. Both cases, however, facilitate demonstration equally of the rotating motion. Here, in this description, it is assumed that the positive (N) poles appear as shown in FIG. 4. Next, in FIG. 3, when the current flows through stator coil 21 from terminal B toward D, stator 17 is excited magnetically as indicated in S(2), and therefore rotor 1 is stabilized at R(2). By this shift from R(1) to R(2), rotor 1 has moved one step. Next, when letting the current flow from terminal C toward terminal A, the rotor is excited magnetically as shown in S(3) and the rotor stabilizes at R(3), while by this shift from R(2) to R(3) the rotor has made another one step move. In the same manner, next, when letting the current flow from terminal D toward terminal B, the rotor is excited magnetically and the rotor stabilizes at R(4), while by this shift from R(3) to R(4) the rotor has made another one step move. By repeating the above-mentioned motion, the rotor is driven to rotate stepwise.

The characteristic feature of the present invention is the further improvement based on the technical concept that the leakage of the magnetic flux outside of the motor is minimized by structuring the front cover 5 and rear cover 9 with magnetic material letting the leaking magnetic flux generated inside of the motor flow through the front and rear covers as the magnetic path, and, as mentioned earlier, the outside diameter side cylindrical parts 6 and 10, cover circular parts 7 and 11, and inside diameter side cylindrical parts 8 and 12 of front cover 5 and rear cover 9 respectively are made of magnetic materials and formulated into one unit. The front and rear covers can be formed by way of forging the magnetic materials, such as iron, or by way of sintering magnetic powder, or by way of binding the magnetic powder with synthetic resin. By this structure, the leaking magnetic flux that is generated when stator 17 is magnetically excited, or the leaking magnetic flux that is generated from permanent magnet 3 as its generating source when stator 17 is at the demagnetized state, flows through front cover 5 and rear cover 9, as its magnetic path, as indicated by a dotted line in FIG. 1, and the magnetic flux leaking to outside of the motor is reduced to the extreme minimum.

Figure 5:
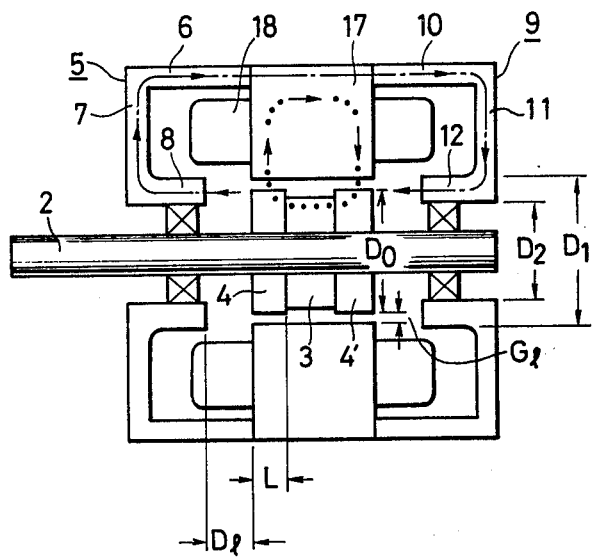
FIG. 5 indicates the dimensional relation of various parts of the motor.

The present invention is designed to provide a structure leakage further reducing the leakage magnetic flux leaking outside the motor, by making a detailed study of the magnetic flux flow inside the motor, and FIG. 5 demonstrates the flow of magnetic flux inside the motor in general, with use of the same symbols as FIG. 1 adding thereto $D_0$ for the outer diameter of rotor yokes 4 and 4', L for the shaftwise length of rotor yokes 4 or 4', $D_1$ and $D_2$ respectively for the outer diameter and inner diameter of the inner diameter side cylindrical parts of the front cover and rear cover, Dl for the distance of space between the end surface of the inner diameter side cylindrical parts of the front and rear covers and the opposing end surface of the rotor yokes, and Gl for the dimension of the air gap between the outer periphery of rotor yokes 4 and 4' and the inner surface of stator 17. In FIG. 5, the magnetic flux exhibited by a dotted line, which flows back through permanent magnet 3, rotor yokes 4 and 4' and stator 17, is the effective magnetic flux, which is necessary for rotating the motor, while the magnetic flux exhibited by one-dot chain line which flows back through permanent magnet 3→ rotor yoke 4→ front cover 5 → stator 17→ rear cover 9→ rotor yoke 4'→ permanent magnet 4 is the leakage magnetic flux which increases the magnetic flux leaking outside of the motor if the leaking magnetic flux is excessive. Namely, most of the aforesaid magnetic flux leakage flows through the front and rear covers, but there exists some amount of magnetic flux which leaks out from the front and rear covers, though it is rather little in its amount. This magnetic flux leaking outside is known to be almost proportional to the magnetic flux flowing through within the magnetic path when the magnetic path of the leaking magnetic flux which includes the front and rear covers is not saturated. So that, in order to reduce the magnetic flux leaking outside the motor, it is effective not to saturate the magnetic path through which the leaking magnetic flux flows back as exhibited by a one-dot chain line, and also to reduce the magnetic flux leakage itself.

Now in FIG. 5, to compare the amount of the effective magnetic flux which participates in the rotation of the motor with that of the leakage magnetic flux which flows back through the front and rear covers, the space permeance of the respective paths of these magnetic fluxes has to be analyzed. The space permeance P of the magnetic path is equal to the amount represented by $$P = \mu_0 \cdot A/l,$$

where A is the dimension of the magnetic path along the direction perpendicular to the magnetic path, l is the length of opening and $\mu_0$ is the magnetic permeance (almost equal to vacuum state), so that the gap permeance Pm of the effective magnetic flux will be $$Pm = \mu_0 \cdot \pi D_0 \cdot L/Gl \quad (1)$$

provided that the opening length Gl should be the effective length of opening taking the length of teeth into account as there are teeth installed. On the other hand, the space permeance Pl of the leakage magnetic flux will be $$Pl = \mu_0 \cdot \frac{\pi(D_1^2 - D_2^2)}{4 \cdot Dl} \quad (2)$$

Assuming that the magnetic exciting power of the magnetic flux of the respective parts is fixed, it is conceived proportional to the permeance of the respective openings, so that in order to maximize enough the effective magnetic flux partipating in generating the torque of the motor and also to reduce the leakage magnetic flux which is harmful as well as useless, the ratio of Pm and Pl has to be maximized, namely $$Pm/Pl = \frac{Dl}{Gl} \cdot \frac{4D_0 \cdot L}{D_1^2 - D_2^2} \quad (3)$$

In this equation (3), the first term represents the ratio of the opening length of the leakage magnetic path and that of the effective magnetic path, while the second term represents the ratio between the sectional dimension of the effective magnetic path and that of the leakage magnetic path.

A further study is made on the equation (3) in the following in comparison with the result of an actual experiment. FIG. 7 is a chart which demonstrates the relationship between Dl/Gl and the magnetic flux leaking outside, in case of a compact stepping electric motor with the structure as shown in FIG. 1 and for driving the magnetic head, when Gl=0.03 mm and Dl is varied within the range of 0.3~6 mm. In this case, $D_0$=22 mm, $D_1$=22 mm, $D_2$=16 mm and L=4 mm, so that the value of the second term in the equation (3), namely $4D_0 \cdot L/(D_1^2 - D_2^2)$ will be about 15, while the actual measurement taken of the effective magnetic flux density was about 1,200 gauss. In FIG. 7, the ordinate represents the density of magnetic flux, while the solid-line curve represents the density of the magnetic flux leaking outside which was actually measured at the point G indicated in FIG. 1, and the broken-line curve exhibits the relationship between the leak magnetic flux and Dl/Gl both of which were calculated on the basis of the effective magnetic flux=1,200 gauss and $4D_0 \cdot L/(D_1^2 - D_2^2)$=1.5, provided the following equation is satisfied on account of the relationship represented by the equation (3):

$$\frac{\text{Effective Magnetic Flux}}{\text{Leading Magnetic Flux}} = \frac{Dl}{Gl} \cdot \frac{4D_0 \cdot L}{D_1^2 - D_2^2} \quad (4)$$

The difference of the magnetic flux density between the solid-line curve and the broken-line curve of FIG. 7 represents the difference between the leak magnetic flux flowing through the front and rear covers of the motor and the magnetic flux leaking outside of the motor. As realized from FIG. 7, the magnetic flux leaking outside of the motor and the leaking magnetic flux flowing through the front and rear covers are almost in a proportionate relation. Reversely from this fact, reduction in the magnetic flux leaking outside the motor can be attained by reducing the leakage magnetic flux flowing through the front and rear covers, and this can be accomplished, in reference to the equation (4), by maximizing the value of $(Dl/Gl) \cdot (4D_0 \cdot L)/(D_1^2 - D_2^2)$, as the effective magnetic flux is the magnetic flux necessary for the rotation of the motor and each motor has its own value.

Furthermore, from the above, if the allowable maximum value of the density of the magnetic flux leaking outside the motor be given, the allowable minimum value of the right sides of the aforesaid equations (3) and (4) respectively, will be made known. As mentioned above, the density of the magnetic flux leaking outside the motor is generally smaller than the density of the leakage magnetic flux flowing through the front and rear covers, and, even in the worst case, it can be conceived equal to the leaking magnetic flux. Therefore, by setting up the relation of $$Dl/Gl > n \cdot (D_1^2 - D_2^2)/(4D_0 \cdot L)$$

the leakage magnetic flux flowing through the motor's front and rear covers can be controlled to less than 1/n of the effective magnetic flux, and also the magnetic flux leaking outside the motor can be controlled to less than 1/n of the effective magnetic flux.

Figure 6:
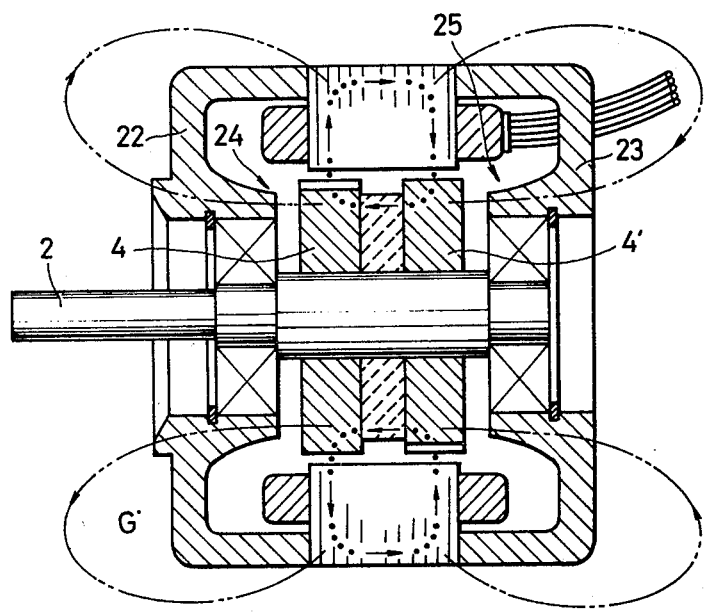
FIG. 6 is a sectional drawing for demonstrating the effect of the present invention in comparison with a conventional motor.

FIG. 6 is a sectional drawing of a conventional permanent magnet type stepping motor, wherein 22 is the front cover and 23 is the rear cover. A structure wherein the front and rear covers are composed of the outer diameter side cylindrical part, cover circular plate part and the inner diameter side cylindrical part in one unit was employed, but in the conventional cases, the one-unit structure was made of such non-magnetic materials as die-cast aluminum, and further, as indicated by the numbers of 24 and 25 in FIG. 6, it was common to put a slant toward the ends of the inner diameter side cylindrical parts opposing the outer periphery of the rotor so as to make the wall thickness thinner toward the end, for the purpose of saving in material and for convenience at the time of manufacture. On account of this structure, a large amount of magnetic flux was leaking outside as shown by a two-dots-chain line in FIG. 6.

Besides above, whereas conventionally bolts and nuts made of such non-magnetic materials as brass were used as the binding bolts and nut 20 as shown in FIG. 2, by changing this material for bolt and nut 20 to iron or any other magnetic materials the leakage magnetic flux will flow directly to the front and rear covers, and further the magnetic flux leaking outside will be reduced. A practical example of this effect is shown in Table-1. This shows the result of measurement of the magnetic density leaking outside the motor taken at the point G cited in FIG. 6 in the respective cases of the conventional example shown in FIG. 6 wherein the front and rear covers are made of non-magnetic material and the embodiment of the present invention as per FIG. 1 wherein iron covers are employed with the values of the right sides of the equations (3) and (4) respectively being set at around 60, and the embodiment of the present invention with iron bolts and nuts for the binding bolt and nut.

TABLE 1

|  | Conventional Motor with Non-Magnetic Covers | | Motor of Present Invention with Iron Covers | | Motor of Present Invention with Iron Core and Iron Bolt & Nut | |
| --- | --- | --- | --- | --- | --- | --- |
| Magnetic Flux Density Gauss | W.E.* 100 | 12 V, 2** P.E. 100 | W.E. 15 | 12 V, 2 P.M.E 15 | W.E. 10 | 12 V, 2 P.E. 10 |

Note:
*W.E. — Without excitation
**12 V, 2 P.E. — 12 V, 2 phase magnetic excitation As dealt with in the foregoing, according to the present invention, it facilitates the manufacture of a motor equipped with a structure which enables one to cope with the allowable maximum magnetic flux leaking outside, that is necessitated in accordance with the objectives for the use of respective stepping motors. Also, it improves the mass-productivity by the possibility of forging or sintering the front and rear covers, while making the binding bolts and nuts with such magnetic materials as iron to produce a stepping motor which has very limited amount of magnetic flux leaking outside.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What we claim is:

1. A permanent magnet type stepping motor that is characterized in having a rotor made of a circular-plate permanent magnet with one side magnetized as N-pole and the other side as S-pole sandwiched between two rotor yokes made of magnetic circular plate and mounted in one unit on a rotor shaft by way of a hole penetrating through its center, a cover comprising a front portion including an outer diameter side cylindrical part, a cover circular plate part, and an inner diameter side cylindrical part installed at the central part of the aforesaid circular plate part all of which are composed in one unit and made of magnetic material and a rear cover of the same construction, the rotor shaft of the aforesaid rotor being held by the inner diameter sides of the respective inner diameter side cylindrical parts of the aforesaid front and rear covers such that the rotor rotates freely, a stator firmly held by binding bolts and nuts between the aforesaid front and rear covers arranged in a position where its inner surface opposes the outer periphery of the aforesaid rotor yokes across a small air gap, toothed wheel-like jags fabricated around the outer periphery of the aforesaid rotor yokes opposing the inner surface of the stator to facilitate the rotor to make a stepwise rotation by letting a stepwise DC current flow through the stator coils wound around the aforesaid stator, wherein with $D_1$ for the outer diameter and $D_2$ for the inner diameter respectively of the inner diameter side cylindrical parts of the aforesaid front cover and rear cover respectively, $D_0$ for the outer diameter of the rotor yokes, L for the respective length of the rotor yokes in the shaftwise direction, Gl for the dimension of the air gap between the outer periphery of the rotor yokes and the inner surface of the stator, Dl for the distance of space between the end surface of the inner diameter side cylindrical parts respectively of the front cover and the rear cover and the opposing end surface of the rotor yokes, and n for any optional number, by satisfying the following relationship $$Dl/Gl > n \cdot (D_1^2 - D_2^2)/(4D_0 \cdot L),$$

the magnetic flux leaking outside the motor is controlled to less than 1/n of the effective magnetic flux.

2. In the permanent magnet type stepping electric motor of claim 1 a permanent magnet type stepping electric motor characterized in having its binding bolts and nuts made of magnetic materials which bind together in one unit the aforesaid front and rear covers.

* * * * *